No. 726,304. PATENTED APR. 28, 1903.
O. H. & W. M. JEWELL.
PROCESS OF FILTERING.
APPLICATION FILED JULY 28, 1902.
NO MODEL. 2 SHEETS—SHEET 1.
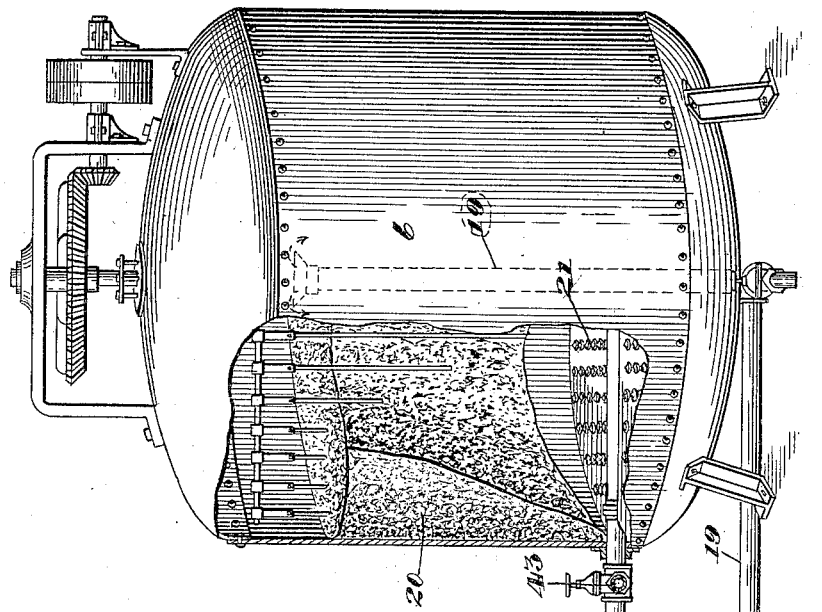
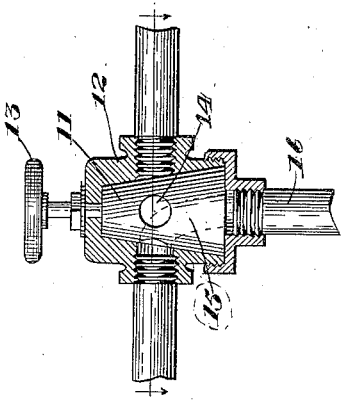
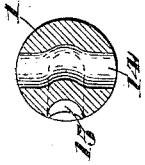
Witnesses.
JB Weir
CM Mernick
Inventors.
Omar H. Jewell
William M. Jewell
by Bond, Adams, Pickard & Jackson
Attys No. 726,304. PATENTED APR. 28, 1903.
O. H. & W. M. JEWELL.
PROCESS OF FILTERING.
APPLICATION FILED JULY 28, 1902.
NO MODEL. 2 SHEETS—SHEET 2.
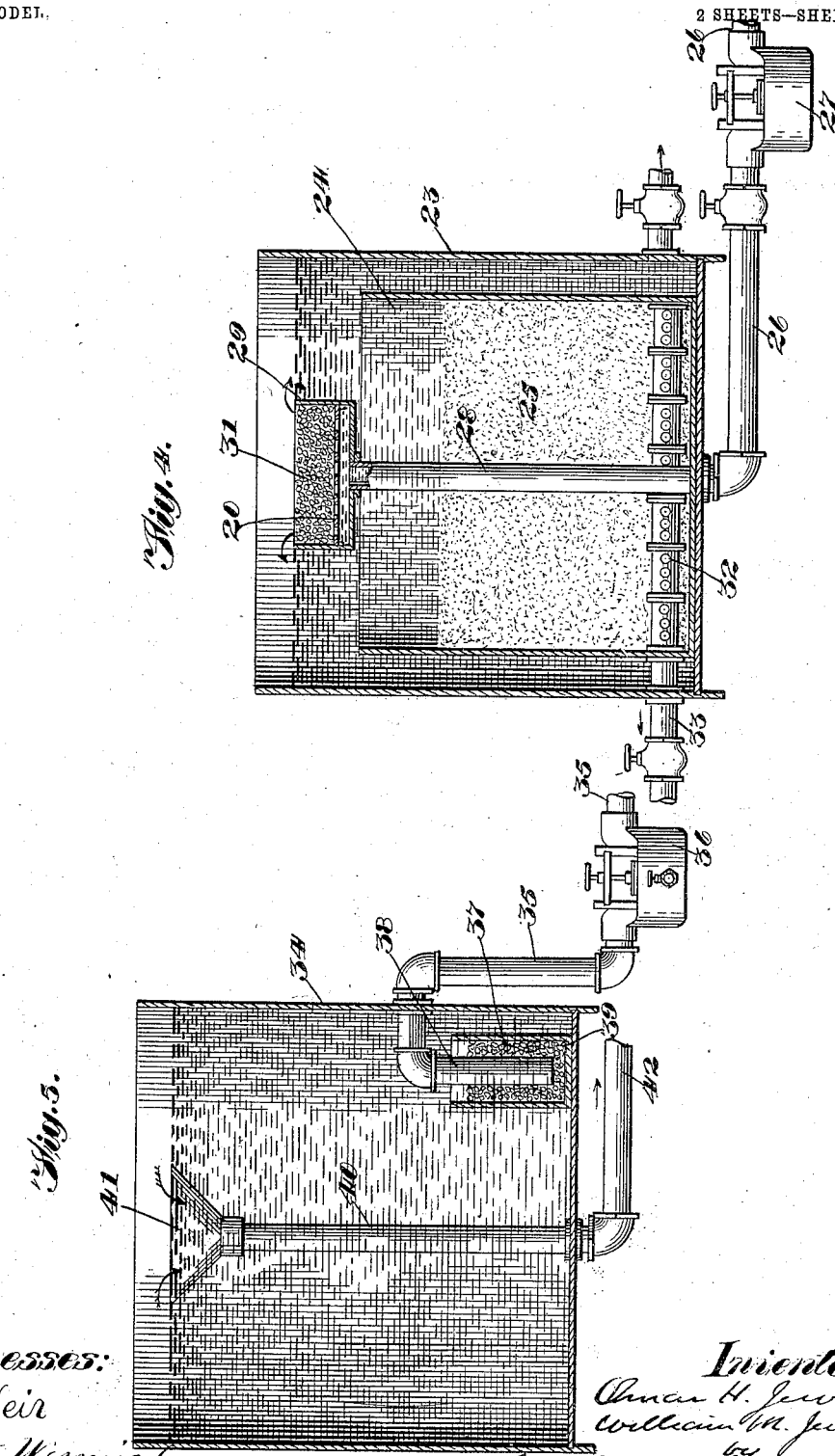
Witnesses:
J B Weir
C M Wermich
Inventors.
Omar H. Jewell
William M. Jewell

UNITED STATES PATENT OFFICE.

OMAR H. JEWELL AND WILLIAM M. JEWELL, OF CHICAGO, ILLINOIS.

PROCESS OF FILTERING.

SPECIFICATION forming part of Letters Patent No. 726,304, dated April 28, 1903.

Application filed July 28, 1902. Serial No. 117,384. (No specimens.)

*To all whom it may concern:*

Be it known that we, OMAR H. JEWELL and WILLIAM M. JEWELL, citizens of the United States, residing at Chicago, in the county of Cook and State of Illinois, have invented a certain new and Improved Process of Filtering, of which the following is a specification, reference being had to the accompanying drawings.

Our invention relates to a new and improved process of filtering water, and particularly to an improvement in the process of filtering water which consists in adding alum, sulfate of alumina, iron salts, or other equivalent coagulant to the water to be filtered; and its object is to provide a new and improved process which will insure the precipitation of the coagulant in water devoid of necessary alkalinity. As applied to water in the process of filtration, the term "alkalinity" signifies the dissolved carbonates or bicarbonates of lime, soda, &c., which exist to a more or less degree in most natural waters. The term "coagulant" as applied to this art refers to the purifying agent which is added to the waters for the purpose of coalescing or coagulating bacteria and other suspended matters sufficiently to insure their retention in the filter-bed. Under this term, as is well known, is included a number of reagents, such as alum, sulfate of alumina, iron salts, and other equivalent substances. As ordinarily used, these coagulants form a clear staple solution in waters devoid of alkalinity—for instance, in distilled waters. In practice these coagulants are added to the water before it passes through the filter-bed, and in the process of filtering generally used and now well known the coagulant—such as alum, sulfate of alumina, or an equivalent substance—is added in the form of a solution from a suitable tank placed in connection with the inlet-pipe, through which the water flows to the filter. By this means a suitable amount of the solution of the coagulant is added to the water on its way to the filter, and the water, with the coagulant solution added to it, then passes through the filter-bed. It is only, however, when there is a sufficient degree of alkalinity in the water to be filtered that these coagulants operate properly. If there is no alkalinity or not a sufficient degree of alkalinity in the water, the dissolved reagents are not precipitated and the process of filtering is not carried out. When there is a sufficient degree of alkalinity in the water, however, the so-called "coagulant" present in the water reacts on the salts in the water and is precipitated, forming an insoluble hydrate, which passing into the filter-bed coagulates or coalesces the bacteria and other suspended matter in the progress of the water through the filter-bed and causes the water to pass from the filter properly purified. The real coagulant, therefore, in such cases is the insoluble hydrate caused by the precipitation of the alum, sulfate of alumina, or other equivalent reagent, as if the reagent—such as alum, for instance—were not precipitated no coagulating effect would follow its introduction into the water. It is consequently of great importance that the water should have a degree of alkalinity sufficient for the purposes of precipitation. Not all waters are sufficiently charged with alkaline salts in their natural condition. Some waters contain a sufficient amount of alkaline salts at some seasons of the year and at others not. For example, during freshets most river-waters are comparatively low in alkalinity, owing to their dilution by soft water from their drainage area. This frequently causes an insufficient amount of alkalinity in the water, with the result that the so-called "coagulant" is only partially precipitated and the balance passes through the filter in solution. It has therefore been customary to resort to various means for supplying this deficiency in the alkalinity of water. For example, it has been customary to add to waters deficient in such alkalinity lime-water or the milk of lime, the effect of which is substantially the same as the presence of carbonates in natural water. The reaction between alum when that is used for a coagulant and the natural carbonates—calcium carbonate, for instance—may be shown by the following equation:

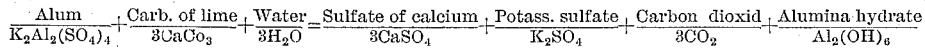

When lime-water is added, the reaction may be illustrated by the following:

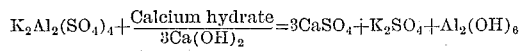

It has also been the practice frequently to add caustic soda or carbonate of soda to the water in the filter for the precipitation of the alum or other coagulant employed. The reaction of such soda solution—for instance, a solution of carbonate of soda—may be illustrated by the following equation:

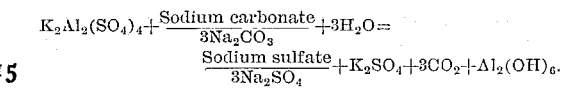

This method of purifying the water is disadvantageous in a number of ways. The preparation of lime or soda solutions involves considerable care and supervision and quite a little labor. It is also of frequent occurrence that there is an excess of lime or soda which appears in the filtered water, due to the difficulty and great care needed in introducing them into the water. In case soda salts are used the filter-beds are made slippery, and therefore the adhesiveness of the sand grains composing the filter-beds is reduced, thereby reducing the friction of the filter-bed, and consequently reducing the efficiency of the filter-bed for the retention of the alumina hydrate and suspended matters enveloped therein. The treatment of water with soda salts when they are employed for the purpose of increasing the alkalinity is expensive and difficult. The use of lime necessitates employing large tanks and slaking-boxes, which are objectionable for many reasons. Besides this, none of these processes is automatic or self-regulating. It has been attempted heretofore to secure the desired results by mixing ground marble with the sand of the filter-bed, which to a limited extent effected precipitation of the dissolved coagulant. This process, however, was objectionable for several reasons. For instance, it was necessary to frequently renew the powdered marble in the filter-bed, which necessitated a disturbing of the filter-bed and the renewal of the sand used therein. Moreover, the coarse marble particles as ordinarily used decreased the efficiency of the filter-bed, because their presence in the filter-bed increased the size of the interstices, depending on the amount of the marble used, to an extent that was likely to interfere with the proper function of the sand. Moreover, the particles of marble being larger and heavier than the sand grains would gradually gravitate to the bottom of the filter-bed every time that it was washed. The incoming water, therefore, which reached the top of the filter-bed first was not reacted upon until it had almost, if not entirely, passed through the filtering medium, and the then precipitated alum was not retained by the filter, and passed out with the filtered water, sometimes giving it a milky appearance and being objectionable for various reasons. Moreover, in many cases and with many waters, as is said above, it is necessary to supply the proper carbonate to the water only at certain seasons of the year, and the placing of the marble particles in the filter-bed did not permit them to be by-passed when the water had a sufficient degree of alkalinity to make it unnecessary to use the marble.

It is the object of our invention to provide a process which shall do away with the above disadvantages and render the filtration of the water complete and perfect.

To that end our process consists, broadly, in supplying to the water to be filtered a solution of alum, sulfate of alumina, iron salts, or other well-known equivalent reagent and passing the water through a separate receptacle containing a suitable insoluble carbonate of lime or magnesia, preferably lumps of marble, although other substances—for example, oyster-shells, limestone, or chalk—might be used.

In carrying out our process we have illustrated in the drawings apparatus in different forms which may be used.

In the drawings, Figure 1 is a view of a pressure-filter, partly cut away and partly in vertical section. Fig. 2 is an enlarged detail showing the valve when it is desired to by-pass the receptacle containing the lumps of marble or other equivalent substance. Fig. 3 is an enlarged detail, being a section through the valve shown in Fig. 2. Fig. 4 is a vertical section of a gravity-filter adapted to employ our process, and Fig. 5 is a vertical section of a settling-basin adapted for the employment of our process, Referring to Fig. 1, 6 indicates a pressure-filter of any well-known and approved type, which it is not necessary to describe in detail.

7 indicates the supply-pipe, by which the water is led to the filter.

8 indicates the ordinary so-called "alum-tank," which is adapted to contain the alum or equivalent solution to be added to the water as it passes through the supply-pipe 7 on its way to the filter in the well-known and approved manner. The alum-tank 8 may be of any approved form and construction and forms no part of our present invention.

9 indicates a chamber which is partly filled with lumps 10 of an insoluble carbonate of lime, preferably, as was said above, marble.

11 indicates a two-way valve seated in a suitable valve-chamber 12 and provided with a hand-wheel 13. The valve is provided with passages 14 and 15.

16 indicates a pipe which passes from below the valve-chamber 12 into the chamber 9, extending nearly to its bottom, and is adapted when the valve is turned into the position shown in Fig. 2 to connect, by means of the passage 15, with the supply-pipe 7. The water passing through the supply-pipe 7 has the proper amount of coagulant in solution supplied to it from the alum-tank 8 in the usual and well-known way, and in the employment of our process when the water is deficient in alkalinity, the valve being turned into the position shown in Fig. 2, it passes through the passage 15 of the valve down through the pipe 16 to the bottom of the chamber 9. The water, with the alum or equivalent solution added, passes upward through the lumps of marble or other equivalent substance, and by the reaction of the alum or equivalent coagulant upon the carbonate of lime the alum or equivalent coagulant in the water is precipitated and passes with the water through pipes 17 18 19 into the filter above the filter-bed 20, as indicated by dotted arrows. Passing down through the filter-bed the precipitated coagulant is retained by the filter-bed, coalescing or gathering the bacteria and other suspended matter in the water and retaining the same in the filter-bed, while the water filtered passes through strainers 21 and out from the filter in the well-known and usual manner through an outlet 43. In case the water, however, possesses a sufficient degree of alkalinity the chamber 9 may be by-passed by turning the valve 12, so that the passage 14 will connect the supply-pipe 7 with the pipe 22, the water thus flowing directly into the filter through the pipes 18 and 19 and not passing through the chamber 9 with its contained carbonate.

Fig. 4 shows our process as applied to a gravity-filter. Referring to that figure, 23 indicates the filter, provided with an interior receptacle 24, provided with the filter-bed 25. 26 indicates the inlet-pipe, and 27 the alum-tank, which supplies the coagulant in the well-known way. The water thus charged with the proper degree of coagulant in solution passes through the pipe 28 upward through the filter into the bottom of an open receptacle 29. The receptacle 29 is provided with a strainer 30 a suitable distance above its bottom, and is filled with a suitable carbonate of lime or magnesia in lumps, preferably marble, 31. The water charged with the coagulant in solution, passing upward through the marble 31, reacts in the way described above, and the coagulant is precipitated. Thus precipitated, the alum passes with the water out over the top of the receptacle 29 and ultimately downward through the filter-bed 25, where the precipitated coagulant, gathering or coalescing the bacteria and other suspended matter, is retained with such suspended matter in the filter-bed. The water after being so filtered passes through strainers 32 out through the pipe 33.

Fig. 5 shows our process as applied to a settling-basin. In this figure, 34 indicates the settling-basin, which is of a suitable size to permit the purification of the water when treated as hereinafter described by the settling of the coagulant, with the gathered impurities, at the bottom of the basin. 35 indicates the supply-pipe, provided with the alum-tank 36, operating in the manner above described to charge the water on its way to the filter with the solution of the coagulant. 37 indicates an open-topped chamber or vessel placed in the bottom of the settling-basin 34. The supply-pipe 35 passes into the settling-basin above the top of the receptacle or chamber 37. 38 indicates a pipe which leads from the supply-pipe 35 to a point nearly at the bottom of the chamber 37. The chamber 37 is filled with a suitable quantity of insoluble carbonate in the form of lumps, preferably marble 39. 40 indicates a pipe which is provided with a flaring top 41 near the top of the basin and extends downward out at the bottom of the basin, terminating in a discharge-pipe 42. In this use of our process the water when deficient in alkalinity is supplied with the coagulant in solution from the alum-tank 36 and then passes downward to the bottom of the chamber 37. Escaping from the pipe it passes upward through the marble contained in the chamber 37, which reacts upon the alum or other coagulant and causes the precipitation of the same. The water thus containing the precipitated alum passes upward out of the chamber 37 into the settling-basin 34 and rises therein until it reaches the level of the flaring mouth 41 of the pipe 40, whence it passes downward and out through the discharge-pipe 42. The chamber 34 of course in such case is made of sufficient size to allow the precipitated coagulant gathering or coalescing the bacteria and other suspended matter in the water to settle to the bottom of the tank with the impurities, so that the water at the top flowing over the flaring entrance to the pipe 40 is properly purified.

The several forms of filter shown in the drawings are illustrative of different methods of employing the process of our invention; but it may of course be applied in other forms.

In the form shown in Figs. 4 and 5 when the water is of a sufficient degree of alkalinity to precipitate the coagulant the marble or equivalent may be removed from the chambers 29 and 37.

Among the advantages of our process it is to be noted that the process is cleanly. It is cheaper in its use than either lime or soda as commonly applied. It has no bad effect upon the sand layer or filter-bed, as is above noted in the case of soda. Its introduction is not attended with any danger of excess, because the carbonate employed in the precipitation of the alum dissolves only to a limited extent, depending upon the amount of free carbonic acid in the water. Its introduction is automatic, as only the excess of alum or other coagulant acts upon it by neutralizing the acidity of that portion of the coagulant not previously precipitated or neutralized by the natural carbonates or so-called "alkalinity" of the water. It can be used in small pressure-filters, owing to its insolubility and ease of manipulation, and can therefore be used in filters of this type, now largely used for household purposes, where the use of lime or soda salts in conjunction with the alum would not be tolerated. One great distinction between the process of our invention and prior processes lies in the fact that heretofore soluble reagents have been used and added to the water, whereas in the case of our process the water is passed through an insoluble reagent, which reacts upon the alum or other coagulant in the water so as to precipitate the same.

We have described and shown our process as passing the water through the chamber containing the insoluble carbonate after the coagulant solution has been added to the water, and in practice it will ordinarily be so employed. Many waters, however, contain a certain percentage of free carbonic-acid gas. When this is present, the carbonic-acid gas will act upon the marble, chalk, or similar material and dissolve the same in the form of a bicarbonate, which passing with the water will react upon the alum to precipitate the same. When, therefore, the water contains sufficient free carbonic-acid gas, the solution of alum or other coagulant may be added afterward. We therefore do not limit our process to first supplying the water with the coagulant and afterward passing the same through the chamber containing the insoluble carbonate, except as hereinafter specifically claimed.

That which we claim as our invention, and desire to secure by Letters Patent, is—

1. The process of filtering water which consists in introducing into the water a coagulant and passing the water through a chamber containing an insoluble carbonate, and thence into a filtering apparatus, substantially as described.

2. The process of filtering water which consists in introducing into the water on its passage to the filtering apparatus a coagulant, then passing the water containing the coagulant through a chamber containing an insoluble carbonate, and then passing the water into a filtering apparatus, substantially as described.

3. The process of filtering water which consists in introducing into the water on its passage to the filtering apparatus a coagulant in solution, then passing the water with the coagulant in solution through a chamber containing an insoluble carbonate capable of precipitating the coagulant, and thence passing the water into a filtering apparatus, substantially as described.

4. The process of filtering water which consists in introducing into the water on its passage to the filtering apparatus a soluble coagulant, thence passing the water through a chamber containing lumps of marble, and thence passing the water into a filtering apparatus, substantially as described.

5. The process of purifying water which consists in introducing into the water a soluble coagulant, passing the water through a chamber containing an insoluble reagent capable of precipitating the coagulant, and afterward removing the coagulated matter, substantially as described.

6. The process of filtering water which consists in introducing into the water a soluble coagulant and passing the water through a chamber containing an insoluble reagent capable of precipitating the coagulant, and then passing the water into a filtering apparatus, substantially as described.

7. The process of filtering water which consists in introducing into the water on its passage to the filtering apparatus a soluble coagulant, then passing the water containing the soluble coagulant through a chamber containing an insoluble reagent capable of precipitating the coagulant, and then passing the water through a filtering apparatus, substantially as described.

OMAR H. JEWELL.
WILLIAM M. JEWELL.

Witnesses:
C. E. PICKARD,
JULIA M. BRISTOL.